United States Patent Office 3,801,517
Patented Apr. 2, 1974

3,801,517
REDUCTION OF CORROSIVITY OF HALOGEN CONTAINING POLYMER VULCANIZATES
John R. Richwine, Newark, Del., assignor to Hercules Incorporated, Wilmington, Del.
No Drawing. Filed June 1, 1972, Ser. No. 258,702
Int. Cl. C23f 15/00
U.S. Cl. 260—2 A      9 Claims

ABSTRACT OF THE DISCLOSURE

The corrosive effects of halogen-containing polymer vulcanizates can be inhibited by the addition of a small amount of the mixture of (1) at least one corrosion inhibiting agent having the general formula $$(R)_n—A—(COOM)_m$$

where each R independently is selected from alkyl, aryl, cycloalkyl, alkoxy, hydroxy, halo, nitro, amino, thio, and ester radicals; A is selected from the group of polyvalent aromatic radicals derived by the removal of a number of hydrogen atoms equal to the sum of $n$ plus $m$ from phenyl, naphthyl, benzophenone, biphenyl, alkylphenyl and alkenylphenyl radicals; M is selected from H, $NH_xR'_y$ where R' is lower alkyl, $x$ is an integer from 2 to 4, $y$ is an integer from 0 to 2 and $x+y=4$, and metals selected from Groups II–A, II–B, IV–A and VIII of the Periodic Chart of Elements; $n$ is an integer from 0 to 3; and $m$ is an integer from 1 to 2; and (2) at least one lead compound selected from the lead salts of aliphatic carboxylic acids, lead salts of aromatic carboxylic acids, lead salts of carbonic acid, lead salts of phosphorous acid, lead salts of silicic acid and lead oxides.

---

This invention relates to the reduction in corrosivity of certain halogen-containing polymer vulcanizates. More particularly, this invention relates to reducing the corrosivity of halogen-containing polymer vulcanizates by adding a lead compound and certain aromatic acid corrosion inhibiting agents.

Halogen-containing polymers are well known in the art and possess a combination of properties which makes them attractive for use in a diversity of applications. The relatively new epihalohydrin polymers, for example, in addition to having generally good overall physical properties, have excellent swelling resistance and are outstanding in aging resistance including outdoor exposure, ozone exposure and heat aging in air at higher temperatures.

Heretofore, however, these polymers have been somewhat handicapped in their utilization because of their tendency to corrode metal surfaces with which they may come in contact. In fact, this corrosivity has been so pronounced in some of the polymers as to limit their utility. Attempts to overcome this problem with various materials have been carried out with less than complete success.

It is an object of this invention, therefore, to provide stable, non-corrosive, halogen-containing polymer vulcanizates.

It is a further object of this invention to provide an improved process for reducing the corrosivity of halogen-containing polymer vulcanizates.

Now in accordance with this invention, it has been found that the corrosivity of halogen-containing polymer vulcanizates can be effectively controlled by adding a small amount of a mixture of at least one lead compound selected from the lead salts of aliphatic carboxylic acids, lead salts of aromatic carboxylic acids, lead salts of carbonic acid, lead salts of phosphorous acid, lead salts of silicic acid and lead oxides and at least one corrosion inhibiting agent having the general formula $$(R)_n—A—(COOM)_m$$

where each R independently is selected from the group consisting of alkyl, aryl, cycloalkyl, alkoxy, hydroxy, halo, nitro, amino, thio, and ester radicals; A is selected from the group of polyvalent aromatic radicals derived by the removal of a number of hydrogen atoms equal to the sum of $n$ plus $m$ from phenyl, naphthyl, benzophenone, biphenyl, alkylphenyl and alkenylphenyl; M is selected from the group consisting of H, $NH_xR'_y$, where R' is lower alkyl, $x$ is an integer from 2 to 4, $y$ is an integer from 0 to 2 and $x+y=4$, and metals selected from the Groups II–A, II–B, IV–A and VIII of the Periodic Chart of Elements (pp. 56–57, 8th ed., Lange's Handbook of Chemistry); $n$ is an integer from 0 to 3; and $m$ is an integer from 1 to 2.

Any corrosive halogen-containing polymer can be treated in accordance with the process of this invention. Typical of such polymers are the epihalohydrin polymers such as described in U.S. Pats. Nos. 3,135,705; 3,158,591; 3,158,580, and the like, including the homopolymers and copolymers of epihalohydrin, containing at least 20% by weight of an epihalohydrin monomer, as for example, epichlorohydrin, or epibromohydron homopolymers, copolymers of two different epihalohydrin polymers or copolymers of an epihalohydrin with one or more other epoxides or oxetanes; neoprene; chlorinated polyethylene; chlorinated butyl rubber; brominated butyl rubber; and ethyl acrylate-chloroethylvinyl ether copolymers.

The above described polymers generally contain a small amount (i.e., from about 0.1% to about 2% by weight) of an antioxidant added at the time of their preparation. It may in some cases be desirable to add a small additional amount of antioxidant during the compounding of the polymer. Exemplary of the most preferred antioxidants are phenyl-β-naphthylamine, di - β - naphthyl-p-phenylenediamine, symmetrical-di-β-naphthyl - p - phenylenediamine, N-isooctyl-p-amino phenol, the reaction product of diphenylamine and acetone, polymerized trimethyldihydroquinoline, 4,4'-thio-bis(6 - tertiary - butyl - m-cresol), the reaction product of crotonaldehyde and 3-methyl-6-tert - butylphenol, nickel dibutyldithiocarbamate and the zinc salt of 2-mercaptobenzimidazole.

The polymers treated in accordance with the process of this invention can be vulcanized by many different methods. For example, they can be vulcanized with urea, thiourea, ammonia, various polyamines and certain heterocyclic compounds in combination with a metal compound. Exemplary of the polyamines which can be used for cross-linking are the aliphatic amines such as ethylenediamine, propylenediamine, tetramethylenediamine, hexamethylenediamine, and diethylenetriamine, cycloaliphatic amines such as melamine, piperazine, and pyrazine; aromatic amines such as p-phenylenediamine, naphthalenediamine, and biphenyldiamine; and polymeric amines such as poly-(2-methyl-5-vinyl pyridine). Instead of a free amine, a salt of an amine can be used. Internal salts of the amine can also be used, as for example, hexamethylenediamine carbamate, which type of salt decomposes to the free amine at or below the curing temperature. In addition to the polyamines, urea, and thiourea, the polymers can be cross-linked with a heterocyclic compound selected from the group consisting of 2-mercaptoimidazolines, 2-mercaptopyrimidines, and thiazoline-2-thiones used in combination with at least one metal compound selected from the group consisting of salts of aromatic carboxylic acids, salts of aliphatic carboxylic acids, salts of carbonic acid, salts of phosphorus acid, salts of silicic acid and oxides of the metals of Groups II–A, II–B and IV–A of the Periodic Table.

When cross-linking with a urea, thiourea, ammonia or polyamine, the amount employed will depend primarily upon the degree of cross-linking desired. Generally from about 0.25% to about 10%, and preferably from about 0.5% to about 5% of the polyamine based on the weight of the polymer will be employed. When using a heterocyclic compound in combination with a metal compound to effect cross-linking, the optimum amount of each compound will again depend upon the degree of cross-linking desired. Generally, however, the amounts added (based on the weight of the polymer) will be within the following ranges: metal compounds, from about 2% to about 20%, heterocyclic compound, from about 0.2% to about 10%.

The anti-corrosion mixture employed in accordance with this invention is, as stated above, a mixture of lead compounds and aromatic acid corrosion inhibiting agents having the general formula $(R)_n$—A—$(COOM)_m$ where R, A, M, $n$ and $m$ are as defined above. Typical aromatic acid corrosion inhibiting compounds useful in accordance with this invention are benzoic acid, benzilic acid, trans-cinnamic acid, 2-naphthylic acid, o-, m-, and p-toluic acid, o-, m-, and p-hydroxybenzoic acid, o-, m-, and p-methoxybenzoic acid, p - aminobenzoic acid, p - dimethylaminobenzoic acid, N-methylanthranilic acid, o-, m-, and p-nitrobenzoic acid, o-, m-, and p-chlorobenzoic acid, o-, m-, and p-bromobenzoic acid, o-, m-, and p-iodobenzoic acid, 2,2'-dithiodibenzoic acid, n-acetylanthranilic acid, o-nitrophenylacetic acid, 2,4'-benzophenonedicarboxylic acid, 2,4-dimethylbenzoic acid, 2,6-dimethylbenzoic acid, 2,4 - dichlorobenzoic acid, nitroterephthalic acid, 2,4,6-trimethylbenzoic acid, 4,5-dihydroxybenzoic acid-3-monogallate, 2-methyl-3-nitrobenzoic acid, 2-methyl - 5 - nitrobenzoic acid, ammonium benzoate, ammonium-o-toluate, lead benzoate, dibasic lead phthalate, lead-o-toluate, magnesium benzoate, calcium benzoate, zinc benzoate, ferric benzoate, ferrous benzoate, cobaltic benzoate, and cobaltous benzoate. It will be understood that many of the aromatic acid corrosion inhibiting agents exist in the form of anhydrides, such as the dimer anhydride of benzoic acid. The use of such anhydrides is included in this invention. Typical lead compounds useful in accordance with this invention are lead monoxide, red lead oxide, lead carbonate, dibasic lead carbonate, lead-ortho-silicate, lead azelate, lead oleate, dibasic lead stearate, lead sebacate, the lead salt of tetradecane dibasic acid, dibasic lead phosphite, and the like. The amount of lead compound and aromatic acid used will depend upon the specific halogen-containing polymer being treated. In general, the lead compound will be present in an amount of from about 1% to about 50%, most preferably from about 5% to about 40%, based on the weight of the polymer. The amount of aromatic acid corrosion inhibiting agent will be from about 0.1% to about 20%, based on the weight of the polymer. In some cases, the same lead compound may be used to both aid in vulcanizing the polymer and for corrosion inhibiting purposes.

In addition to the anti-corrosion agents and cross-linking agents, other ingredients can also be incorporated. The additives commonly used in rubber vulcanization can be used here also, as for example, fillers such as carbon black and silica; extenders; pigments; plasticizers; and softeners. Obviously, there are many cases in which other additives are not required or desired and excellent results are achieved when only the anti-corrosion agents and cross-linking agents are added.

The ingredients can be incorporated in the polymer by various methods, such as by malaxating between the rolls of a differential 2-roll mill, or in a Banbury mixer, or equivalent malaxating equipment employing customary temperatures and working techniques.

The following examples will illustrate the process of reducing the corrosivity of halogen-containing polymer vulcanizates in accordance with this invention. All parts and percentages are by weight unless otherwise specified.

GENERAL PROCEDURE FOR PREPARATION OF VULCANIZATES

In all of the examples, polymer stocks are made by mixing on a 2-roll mill (rolls maintained at about 170° F.) 100 parts of dry polymer with carbon black, the specified cross-linking agents, anti-corrosion agents and any other additives for about 20 minutes. The polymer is first added to the mill and when it bands (within about 2 minutes), the other ingredients are added in the general order: carbon black, followed by anti-corrosion agents, followed by cross-linking agents. There is one exception to this order of addition, in the case of neoprene, a metal stabilizer must be added before compounding. Where recipes indicate omissions, the order of addition is merely advanced. All stocks are then cured in 2-part steel molds for the time period and at the temperature and pressure indicated. Specimen thickness is approximately 80 mils.

CORROSION TEST PROCEDURE

In each of the examples, the cured polymers are tested for corrosivity. Test samples of the cured polymers 1 x ¼" are cut from the molded specimens, dipped in ethanol, allowed to dry, and placed between 1 x 2" steel plates. The plates are of 1020 steel with a 10 micro-inch finish and a grain running the length of the plate. Each plate is rinsed in toluene and washed with methyl ethyl ketone before placing the test samples therein. Each test sample is compressed at least 0.005 inch but not more than 0.009 inch between the plates by the use of stainless steel shims. The assembled test specimens are preheated for 1 hour at 100° F. prior to testing. Each assembled test specimen is hung in a chamber maintained at a temperature of 100° F. at a relative humidity of 100 percent for 4 days. At the completion of 4 days, the test specimen is taken out of the chamber, the polymer removed, the plates rinsed in naphtha, dried, and the surface cleaned with crocus cloth. The plates are then examined for evidence of corrosion and graded arbitrarily according to the GMRL corrosion rating system from 0 to 5. For a further discussion of the GMRL corrosion rating system see H. E. Trexler et al., Journal of Applied Polymer Science, vol. 8, No. 2, pp. 673–685 (1964). On the GMRL scale, the higher the number the greater the corrosion. For example, 0 indicates no corrosion, while 5 indicates severe crevice corrosion plus pitting.

EXAMPLES 1–29

These examples illustrate the use of red lead oxide and an aromatic acid corrosion inhibiting agent in the vulcanization of an epihalohydrin copolymer.

In each example, 100 parts of an epichlorohydrin-ethylene oxide copolymer having a molecular weight of approximately 1,500,000 and containing the monomers in a 1:1 mole ratio is milled and cross-linked with 1.5 parts of 2-mercaptoimidazoline, 50 parts of fast extruding furnace black, 1 part of sorbitan monostearate, processing aid, 1 part of nickel dibutyldithiocarbamate, antioxidant, 15 parts of red lead oxide and 5 parts of aromatic acid corrosion inhibiting agent. Each formulation is cured for 45 minutes at 340° F. under 100 p.s.i. pressure. The specific aromatic acid corrosion inhibiting agent and the corrosion rating according to the GMRL scale is listed below in Table I. The control sample is run in exactly the same way except for the addition of aromatic acid corrosion inhibiting agent.

TABLE I

| Example | Additive (5 parts) | Corrosion rating (GMRL) |
|---|---|---|
| 1 | Control | [1] 5 |
| 2 | Benzoic acid | 3½ |
| 3 | Benzilic acid | 3 |
| 4 | Trans-cinnamic acid | 3½ |
| 5 | 2-naphthoic acid | 4 |
| 6 | o-Toluic acid | ½ |
| 7 | m-Toluic acid | 2½ |
| 8 | p-Toluic acid | 3 |
| 9 | o-Hydroxybenzoic (salicylic) acid | 4 |
| 10 | p-Hydroxybenzoic acid | 2½ |
| 11 | o-Methoxybenzoic acid | 3 |
| 12 | m-Methoxybenzoic acid | 3 |
| 13 | p-Methoxybenzoic (anisic) acid | 3½ |
| 14 | p-Aminobenzoic acid | 2½ |
| 15 | p-Dimethylaminobenzoic acid | 3½ |
| 16 | N-methylanthranilic acid | 4 |
| 17 | o-Nitrobenzoic acid | 3 |
| 18 | m-Nitrobenzoic acid | 1½ |
| 19 | p-Nitrobenzoic acid | 3½ |
| 20 | o-Chlorobenzoic acid | 1 |
| 21 | m-Chlorobenzoic acid | 4 |
| 22 | p-Chlorobenzoic acid | 2½ |
| 23 | o-Bromobenzoic acid | 4 |
| 24 | m-Bromobenzoic acid | 4 |
| 25 | p-Bromobenzoic acid | 4 |
| 26 | o-Iodobenzoic acid | 4 |
| 27 | 2,2'-dithiodibenzoic acid | 4 |
| 28 | n-Acetylanthranilic acid | 3½ |
| 29 | o-Nitrophenylacetic acid | 4 |

[1] Much greater than.

EXAMPLES 30-37

These examples illustrate the use of di- and higher substituted aromatic acid corrosion inhibiting agents in the vulcanizing system of Examples 1–29.

In each example, 100 parts of the epichlorohydrin-ethylene oxide copolymer described in Examples 1–29 is vulcanized as described in Examples 1–29. The specific aromatic acid corrosion inhibiting agents and the corrosion ratings are listed in Table II.

TABLE II

| Example | Additive (5 parts) | Corrosion rating (GMRL) |
|---|---|---|
| 30 | 2,4-dimethylbenzoic acid | 2½ |
| 31 | 2,6-dimethylbenzoic acid | 2 |
| 32 | 2,4-dichlorobenzoic acid | 2½ |
| 33 | Nitroterephthalic acid | 4 |
| 34 | 2,4,6-trimethylbenzoic acid | 3½ |
| 35 | 4,5-dihydroxybenzoic acid-3-monogallate | 3 |
| 36 | 2-methyl-3-nitrobenzoic acid | 2½ |
| 37 | 2-methyl-5-nitrobenzoic acid | 2½ |

EXAMPLES 38-56

These examples illustrate varying the concentrations of lead compound and aromatic acid corrosion inhibiting agent in the vulcanization of epihalohydrin copolymers.

In each example, epichlorohydrin-ethylene oxide copolymer as described in Examples 1–29 is vulcanized using the process described in Examples 1–29 but varying the lead compound and aromatic acid corrosion inhibiting agent. Red lead oxide is used as the lead compound and o-toluic acid as the aromatic acid. The specific amounts of lead compound and aromatic acid with the corresponding corrosion ratings are listed in Table III.

TABLE III

| Example | Parts red lead oxide (Pb₃O₄) | o-Toluic acid, parts | Corrosion rating (GMRL) |
|---|---|---|---|
| 38 | 5 | Control | [1] 5 |
| 39 | 5 | 2.5 | 5 |
| 40 | 5 | 5 | 4 |
| 41 | 10 | Control | >5 |
| 42 | 10 | 1.25 | 4 |
| 43 | 10 | 2.5 | 3 |
| 44 | 10 | 5 | 2½ |
| 45 | 15 | Control | >5 |
| 46 | 15 | 1.25 | 2½ |
| 47 | 15 | 2.5 | 1½ |
| 48 | 15 | 5 | ¾ |
| 49 | 15 | 7.5 | ½ |
| 50 | 18 | 1.5 | 2½ |
| 51 | 20 | Control | >5 |
| 52 | 20 | 5.0 | ½ |
| 53 | 20 | 7.5 | ¼ |
| 54 | 30 | Control | 5 |
| 55 | 30 | 1.25 | 3 |
| 56 | 30 | 5.0 | 1 |

[1] Much greater than.

EXAMPLES 57-67

These examples illustrate the use of various lead compounds with various aromatic acid corrosion inhibiting agents in the vulcanization of an epihalohydrin copolymer.

In each example, an epichlorohydrin-ethylene oxide copolymer described in Examples 1–29 is vulcanized also as described in Examples 1–29. The specific lead compound, aromatic acid and the amounts used, with the corresponding corrosion ratings, are tabulated below in Table IV.

TABLE IV

| Ex. | Stabilizer, parts | Aromatic acid, parts | Corrosion rating (GMRL) |
|---|---|---|---|
| 57 | Red lead oxide, 10 | o-Toluic, 5 | 2½ |
| 58 | Dibasic lead phosphite, 15 | do | 3 |
| 59 | Dibasic lead phthalate, 10 | o-Toluic 2.5 | 4 |
| 60 | Dibasic lead phthalate, 15 | do | 3½ |
| 61 | do | m-Nitrobenzoic, 2.5 | 3½ |
| 62 | Litharge, 7.5 | o-Toluic 5 | 3 |
| 63 | Lead carbonate, 17.6 | do | 2½ |
| 64 | Dibasic lead phosphite, 15 | o-Chlorobenzoic, 5 | 3 |
| 65 | do | m-Nitrobenzoic, 5 | 3 |
| 66 | Dibasic lead stearate, 26.7 | o-Toluic, 5 | ¾ |
| 67 | Lead salicylate, 15.0 | o-Toluic, 3 | 2½ |

EXAMPLES 68-90

These examples illustrate the use of ammonia and metal salts of the aromatic acid corrosion inhibiting agents in the vulcanization of epihalohydrin copolymer.

In each example, an epichlorohydrin-ethylene oxide copolymer is vulcanized as described in Examples 1–29. The specific aromatic acid salt, its amount, the amount of red lead used and the corrosion rating are tabulated below in Table V.

TABLE V

| Ex. | Additive, parts | Red lead oxide, parts | Corrosion rating (GMRL) |
|---|---|---|---|
| 68 | Lead(II) o-toluate, 5 | 15 | 2½ |
| 69 | do | 5 | 3 |
| 70 | Lead(II) o-toluate, 5 | 0 | 4 |
| 71 | Lead (II) o-toluate, 10 | 5 | 2¾ |
| 72 | Ammonium o-toluate, 5.67 | 15 | 3½ |
| 73 | Ammonium o-toluate, 6.5 [1] | 15 | 2¾ |
| 74 | Beryllium (II) o-toluate, 10 | 15 | 1½ |
| 75 | Magnesium(II) o-toluate, 10 | 15 | 1¾ |
| 76 | Calcium(II) o-toluate, 10 | 15 | 1½ |
| 77 | Barium(II) o-toluate, 10 | 15 | 1 |
| 78 | Zinc(II) o-toluate, 10 | 15 | 2 |
| 79 | Cadmium (II) o-toluate, 10 | 15 | 1½ |
| 80 | Mercury(II) o-toluate, 10 | 15 | 2½ |
| 81 | Stannous o-toluate, 10 | 15 | 2 |
| 82 | Ferrous o-toluate, 10 | 15 | 3 |
| 83 | Cobaltous o-toluate, 10 | 15 | 2¾ |
| 84 | Cobaltic o-toluate, 10 | 15 | 2½ |
| 85 | Nickel(II) o-toluate, 10 | 15 | 1½ |
| 86 | Rhodium(III) o-toluate, 10 | 15 | 3 |
| 87 | Iridium(IV) o-toluate, 10 | 15 | 3 |
| 88 | N-methylammonium o-toluate, 5.5 | 15 | 2¾ |
| 89 | N,N-diethylammonium o-toluate, 5.7 | 15 | 2½ |
| 90 | N-butylammonium o-toluate, 5.7 | 15 | 3 |

[1] In this example only 0.5 part of 2-mercaptoimidazoline is used.

EXAMPLES 91-110

These examples illustrate the use of a lead oxide and aromatic acid in inhibiting corrosion of an epihalohydrin vulcanizate using various vulcanizing agents.

In each example, an epichlorohydrin-ethylene oxide copolymer as described in Examples 1–29 is milled and cross-linked with 50 parts of fast extruding furnace black, 1 part of sorbitan monostearate, 1 part of nickel dibutyldithiocarbamate, 15 parts of red lead oxide, and the amounts of other ingredients tabulated below in Table VI. The specific vulcanizing agent, its amount, as well as the specific aromatic acid and its amount, along with the number of minutes of cure and the corrosion rating are listed in Table VI. In each example, the formulation is cured at a temperature of 320° F.

TABLE VI

| Example | Vulcanizing agent, parts | Aromatic acid, parts | Cure, minutes | Corrosion rating (GMRL) |
|---|---|---|---|---|
| 91 | Anhydrous piperazine, 0.88 | Control | 45 | 15 |
| 92 | do | m-Nitrobenzoic, 5 | 45 | 1¾ |
| 93 | do | p-Aminobenzoic, 10 | 45 | 2¾ |
| 94 | Piperazine plus 2-mercaptoimidazoline, 0.44 plus 0.88 | m-Nitrobenzoic, 7.5 | 45 | ¾ |
| 95 | do | o-Chlorobenzoic, 5.0 | 45 | ¾ |
| 96 | Piperazine plus 2-mercaptoimidazoline, 0.66 plus 0.44 | o-Toluic, 5.0 | 45 | 1½ |
| 97 | Ammonium carbonate, 1.44 | do | 45 | 2 |
| 98 | Hexamethylenediamine carbamate, 3.0 | do | 45 | 3½ |
| 99 | Ammonium o-toluate, 2.3 | (²) | 60 | 1½ |
| 100 | Anhydrous piperazine, 0.88 | m-Nitrobenzoic, 5.0 | 30 | 2½ |
| 101 | do | o-Chlorobenzoic, 5.0 | 30 | 1¾ |
| 102 | Thiourea, 1.0 | do | 60 | 1 |
| 103 | N-methylthiourea, 1.0 | do | 60 | ¾ |
| 104 | Biuret, 1.0 | do | 60 | 1½ |
| 105 | Urea, 1.5 | do | 60 | 1¼ |
| 106 | Triethylenetetramine, 0.5 | do | 60 | 1¾ |
| 107 | Poly(2-methyl-5-vinylpyridine), 1.0 | do | 60 | 2¼ |
| 108 | 2-mercaptopyrimidine, 1.5 | do | 60 | 1 |
| 109 | Ammonium o-tuluate, 3.45 | m-Nitrobenzoic, 3.0 | 60 | 2¾ |
| 110 | Piperazine plus 2-mercaptoimidazoline, 0.44 plus 0.88 | o-Toluic plus p-aminobenzoic 3.0 plus 5.0 | 45 | 1¾ |

¹ Much greater than.
² The ammonium o-toluate functions as both curative and corrosion inhibitor.

EXAMPLES 111–116

These examples illustrates the use of a mixture of aromatic acid corrosion inhibiting agents and a lead compound in the vulcanization of an epihalohydrin copolymer.

In each example, except where noted, epichlorohydrin-ethylene oxide copolymer is vulcanized as described in Examples 1–29. The specific mixture of aromatic acids, the amounts used and the corrosion ratings are listed in Table VII below.

TABLE VII

| Ex. | Aromatic acid, parts | Aromatic acid, parts | Corrosion rating (GMRL) |
|---|---|---|---|
| 111 | m-Nitrobenzoic, 2.5 | p-Aminobenzoic, 5.0 | 3½ |
| 112 | o-Toluic, 5.0 | do | 2½ |
| 113 | Ammonium o-toluate, 2.8 | o-toluic acid, 2.5 | ¼ |
| 114 | o-Toluic plus m-nitrobenzoic, 2.5 plus 2.5 | p-Aminobenzoic, 5.0 | 2½ |
| 115 | o-Toluic, 5.0 | do | ¹¾ |
| 116 | Lead o-toluate, 5.0 | m-Nitrobenzoic, 2.5 | 1 |

¹ Formulation also contains high temperature stabilizers.

EXAMPLES 117–128

These examples illustrate inhibiting the corrosive effects of various halogen-containing polymer vulcanizates with o-toluic acid and a lead compound.

The exact formulations, cure time, cure temperature and corrosion rating are tabulated below in Table VIII.

TABLE VIII

| | Examples, parts of— | | | | | | | | | | | |
|---|---|---|---|---|---|---|---|---|---|---|---|---|
| | 117 | 118 | 119 | 120 | 121 | 122 | 123 | 124 | 125 | 126 | 127 | 128 |
| Formulation: | | | | | | | | | | | | |
| Poly(epichlorohydrin) ¹ | 100 | 100 | | | 60 | 60 | | | | | | |
| Epichlorohydrin—ethyleneoxide copolymer ² | | | 100 | 100 | | | | | | | | |
| Do ³ | | | | | 40 | 40 | | | | | | |
| Poly(chloroprene) ⁴ | | | | | | | 100 | 100 | | | | |
| Chlorinated polyethylene ⁵ | | | | | | | | | 100 | 100 | | |
| Ethylacrylate-chloroethyl vinyl ether copolymer ⁶ | | | | | | | | | | | 100 | 100 |
| Akroflex CD ⁷ | | | | | | | 2 | 2 | | | | |
| Hydrogenated stearic acid | | | | | | | 0.5 | 0.5 | | | 2.0 | 2.0 |
| Sorbitan monostearate | 1.0 | 1.0 | 1.0 | 1.0 | 1.0 | 1.0 | | | | | | |
| Nickel dibutyldithiocarbamate | 1.0 | 1.0 | 1.0 | 1.0 | 1.0 | 1.0 | | | | | | |
| Red lead | 7.5 | 7.5 | 15 | 15 | 15 | 15 | 20 | 20 | | | 10 | 10 |
| Fast extruding furnace black | 50 | 50 | 50 | 50 | 40 | 40 | 50 | 50 | 30 | 30 | 40 | 40 |
| Medium thermal black | | | | | 20 | 20 | | | | | | |
| Dibasic lead phthalate | | | | | | | | | 10 | 10 | | |
| Dibasic lead stearate | | | | | | | | | 1.0 | 1.0 | | |
| Sulfur (tube brand) | | | | | | | | | | | 5 | 5 |
| Trimene base ⁸ | | | | | | | | | | | 3 | 3 |
| 2-mercaptoimidazoline | 1.0 | 1.0 | 1.5 | 1.5 | 1.5 | 1.5 | | | 1.5 | 1.5 | | |
| o-Toluic acid | 0 | 3 | 0 | 5 | 0 | 1.5 | 0 | 5 | 0 | 5 | 0 | 5 |
| Cure: | | | | | | | | | | | | |
| Cure time (minutes) | 45 | 45 | 90 | 90 | 60 | 60 | 25 | 25 | 30 | 30 | 30 | 30 |
| Cure temperature, °F | 320 | 320 | 320 | 320 | 320 | 320 | 307 | 307 | 340 | 340 | 310 | 310 |
| Post cure time (hours) | | | | | | | | | | | 24 | 24 |
| Post cure temperature, °F | | | | | | | | | | | 300 | 300 |
| Corrosion rating; GMRL | 3½ | 0 | >>5 | ¾ | 5 | 1 | ½ | 0 | 1 | ¼ | 4 | 2¼ |

¹ Having a molecular weight of approximately 500,000.
² Having a 1:1 mole ratio and a molecular weight of approximately 2,800,000.
³ Having a 1:1 mole ratio and a molecular weight of approximately 1,500,000.
⁴ Sold by Du Pont as Neoprene GN.
⁵ Containing 36% chlorine and having a molecular weight of approximately 20,000.
⁶ Containing 95% ethylacrylate end 5% chloroethyl vinyl ether.
⁷ A mixture of 65% phenyl-β-naphthylamine end 35% N,N'-diphenylenediamine.
⁸ Formaldehyde-ammonia-ethyl chloride reaction product.

What I claim and desire to protect by Letters Patent is:

1. A process of reducing the corrosivity of corrosive halogen-containing polymer vulcanizates toward metals which comprises adding to said halogen-containing polymer before vulcanization a small amount of a mixture of (1) at least one corrosion inhibiting agent having the general formula $(R)_n$—A—$(COOM)_m$ where each R independently is selected from the group consisting of alkyl, aryl, cycloalkyl, alkoxy, hydroxy, halo, nitro, amino, and carboxylic acid ester radicals; A is selected from the group of polyvalent aromatic radicals derived by the removal of a number of hydrogen atoms equal to the sum of $n$ plus $m$ from phenyl, naphthyl, benzophenone, biphenyl, phenyl disulfide, alkylphenyl and alkenylphenyl; M is selected from the group consisting of H, and $NH_xR'_y$ where R' is lower alkyl, $x$ is an integer from 2 to 4, $y$ is an integer from 0 to 2 and $x+y=4$; $n$ is an integer from 0 to 3; and $m$ is an integer from 1 to 2, and (2) at least one lead compound selected from the lead salts of aliphatic carboxylic acids, lead salts of aromatic carboxylic acids, lead salts of carbonic acid, lead salts of phosphorous acid, lead salts of silicic acid and lead oxides.

2. The process of claim 1 wherein the lead compound is red lead oxide.

3. The process of claim 1 wherein the corrosion inhibiting agent is o-toluic acid.

4. The process of claim 1 wherein the corrosion inhibiting agent is m-nitrobenzoic acid.

5. The process of claim 1 wherein the corrosive halogen-containing polymer vulcanizate is an epihalohydrin polymer vulcanizate.

6. In a process of vulcanizing a halogen-containing polymer, the improvement of reducing the corrosivity of the resulting vulcanizate toward metals which comprises adding to the said polymer before vulcanizing a small amount of a mixture of (1) at least one corrosion inhibiting agent having the general formula

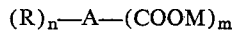
$$(R)_n-A-(COOM)_m$$

where each R independently is selected from the group consisting of alkyl, aryl, cycloalkyl, alkoxy, hydroxy, halo, nitro, amino, and carboxylic acid ester radicals; A is selected from the group of polyvalent aromatic radicals derived by the removal of a number of hydrogen atoms equal to the sum of $n$ plus $m$ from phenyl, naphthyl, benzophenone, biphenyl, phenyl disulfide, alkylphenyl and alkenylphenyl; M is selected from the group consisting of H, and $NH_xR'_y$ where R' is lower alkyl, $x$ is an integer from 2 to 4, $y$ is an integer from 0 to 2 and $x+y=4$; $n$ is an integer from 0 to 3; and $m$ is an integer from 1 to 2, and (2) at least one lead compound selected from the lead salts of aliphatic carboxylic acids, lead salts of aromatic carboxylic acids, lead salts of carbonic acid, lead salts of phosphorous acid, lead salts of silicic acid and lead oxides.

7. A corrosive halogen-containing polymer vulcanizate having reduced corrosivity toward metals resulting from treatment of said polymer before vulcanization with a small amount of a mixture of (1) at least one corrosion inhibiting agent having the general formula

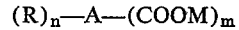
$$(R)_n-A-(COOM)_m$$

where each R independently is selected from the group consisting of alkyl, aryl, cycloalkyl, alkoxy, hydroxy, halo, nitro, amino, and carboxylic acid ester radicals; A is selected from the group of polyvalent aromatic radicals derived by the removal of a number of hydrogen atoms equal to the sum of $n$ plus $m$ from phenyl, naphthyl, benzophenone, biphenyl, phenyl disulfide, alkylphenyl and alkenylphenyl; M is selected from the group consisting of H, and $NH_xR'_y$ where R' is lower alkyl, $x$ is an integer from 2 to 4, $y$ is an integer from 0 to 2 and $x+y=4$; $n$ is an integer from 0 to 3; and $m$ is an integer from 1 to 2, and (2) at least one lead compound selected from the lead salts of aliphatic carboxylic acids, lead salts of aromatic carboxylic acids, lead salts of carbonic acid, lead salts of phosphorous acid, lead salts of silicic acid and lead oxides.

8. The product of claim 7 wherein the corrosive halogen-containing polymer vulcanizate is an epihalohydrin polymer vulcanizate.

9. A process of reducing the corrosivity of corrosive halogen-containing polymer vulcanizates toward metals which comprises adding to said halogen-containing polymer before vulcanization a small amount of a mixture of o-toluic acid and a lead oxide.

References Cited

UNITED STATES PATENTS

| | | | |
|---|---|---|---|
| 2,782,176 | 2/1957 | Darby et al. | 260—30.6 |
| 3,230,037 | 1/1966 | Kunz | 23—71 |
| 3,239,486 | 3/1966 | Willis | 260—45.75 |
| 3,285,893 | 11/1966 | Vandenberg | 260—88.3 |
| 3,298,980 | 1/1967 | Lundberg et al. | 260—18 |
| 3,341,475 | 9/1967 | Vandenberg | 260—2 |
| 3,341,491 | 9/1967 | Robinson et al. | 260—45.75 |
| 3,454,514 | 7/1969 | Baum | 260—23 |
| 3,461,081 | 8/1969 | Sugahara et al. | 252—400 |
| 3,645,944 | 2/1972 | White et al. | 260—23 XA |

OTHER REFERENCES

Arots et al.: Def. Publ. of Ser. No. 809,368, filed Mar. 21, 1969, published in 866 O.G. 23 on Sept. 2, 1969, class 260, sub. 37.

Chem. Abst., 54, 9635f (1960).

WILLIAM H. SHORT, Primary Examiner

E. A. NIELSEN, Assistant Examiner

U.S. Cl. X.R.

260—2 XA, 45.75 R, 92.3, 94.9 H